United States Patent [19]

Kelemen et al.

[11] Patent Number: 5,075,958
[45] Date of Patent: Dec. 31, 1991

[54] SEPARATOR FOR ELECTROCHEMICAL CELL AND PROCESS FOR THE ASSEMBLING IT INTO THE CELL

[75] Inventors: Marc P. Kelemen, North Olmsted; Harry R. Huhndorff, Bay Village, both of Ohio; Craig A. Cooper, Randleman, N.C.

[73] Assignee: Eveready Battery Company, Inc., St. Louis, Mo.

[21] Appl. No.: 560,651

[22] Filed: Jul. 30, 1990

[51] Int. Cl.$^5$ .............................................. H01M 2/00
[52] U.S. Cl. ........................................ 29/730; 29/731; 29/623.2; 429/133; 429/135; 429/169; 429/170
[58] Field of Search ............... 429/133, 135, 169, 170; 29/730, 731, 633.2, 1

[56] References Cited

U.S. PATENT DOCUMENTS

| | | | |
|---|---|---|---|
| 2,287,114 | 6/1942 | McEachron | 429/133 |
| 3,089,914 | 5/1960 | Carmichael et al. | 136/143 |
| 3,097,975 | 7/1963 | Horn et al. | 136/145 |
| 3,748,181 | 7/1973 | Alberto | 136/107 |
| 4,220,693 | 9/1980 | Di Palma et al. | 429/145 |
| 4,679,316 | 7/1987 | Simonton et al. | 29/731 |

FOREIGN PATENT DOCUMENTS 2181594 9/1986 United Kingdom .

Primary Examiner—Asok Pal
Attorney, Agent, or Firm—Robert W. Welsh

[57] ABSTRACT

An electrochemical cell, such as an alkaline cell, employing a multi-strip separator formed into a closed end cylindrical configuration and where an electrically insulating barrier, such as a plastic film, is disposed at the bottom surface of the separator to prevent electrical shorting between the electrodes of the cell at this location.

20 Claims, 1 Drawing Sheet

SEPARATOR FOR ELECTROCHEMICAL CELL AND PROCESS FOR THE ASSEMBLING IT INTO THE CELL

FIELD OF THE INVENTION

The invention relates to electrochemical cells, such as alkaline cells, which employ a tubular separator closed at one end which is composed of at least two separator strips each having a bottom segment and extending side walls with the bottom segment of one strip superimposed on the bottom segment of the other strip and wherein an electrically insulating barrier, such as a plastic film, is positioned on the surface of at least one of the bottom segments of the strips to prevent electrical shorting between the electrodes of the cell at the bottom vicinity of the cell assembly. The invention also relates to a process for assembling the separator in the cell.

BACKGROUND OF THE INVENTION

The subject invention is primarily suited for use with alkaline type cells. Standard alkaline cells are conventionally manufactured with a cathode which generally comprises predominantly an oxide depolarizer, such as manganese dioxide usually admixed with a binder and conductive material such as graphite and the like. The cathode is generally pressed firmly against the inside wall of a container with the inner portion of the cathode left hollow so that the cathode assumes a closed end cylindrical structure with a centrally defined cavity. Separator material, usually formed into thin sheets of paper like material, is inserted into the cathode's central cavity and conforms to the cavity of the cathode. An anode which usually comprises a consumable anodic material such as powder zinc admixed with a gelling agent such as polyacrylic acid or carboxymethyl cellulose and a suitable alkaline electrolyte such as an aqueous potassium hydroxide solution, is then extruded into the cavity of the separator. Thus the sheets of separator material electrically isolates the anode from the cathode while simultaneously permitting ions to flow between the electrodes. Generally, the separator strips can be forced downward and through the cathode's central cavity so that the separator's center region is parallel with and close to the bottom of the container. Occasionally, the insertion of the separator, using a rod driving means, forces the center region of the separator into the cathode material at the bottom of the container. On occasions, small pieces of the cathode are driven into and partially through the separator. This can result in short circuit of the anode and cathode of the cell thus rendering the cell useless. In addition, sometimes during discharge of the cell, zinc dendrites are formed that can extend through the separator at the bottom region of the container and short circuit the cell. These problems are difficult to detect because the cell would have to be disassembled in order to inspect the bottom central portion of the separator for evidence of cathode mix penetration or dendrite penetration.

British Patent 2,181,584 describes a method of producing a separator basket for standard alkaline batteries. This process uses a mandrel to form and support a tube of separator material on which the separator material is folded over one end of the tube and then a small amount of sealant is dispensed on the outside surface of the folded over bottom of the separator to form a "basket". The sealant seals the end of the separator basket and in some applications may secure the separator to other cell components such as the cathode. A final step may include insertion of a can containing a molded cathode over the mandrel-supported separator.

Canadian Patent 993,934 discloses that carbon-zinc cells are commonly manufactured by inserting a carbon rod into a zinc can that contains cathode mix. This manufacturing process is known to suffer from occasional mix penetration through the separator beneath the carbon rod. This patent describes bottom cups that have a mix impermeable substance applied to the central region of the cup's inner surface. Coating only the central portion of the bottom cup effectively prevents mix penetration directly beneath the carbon rod while maximizing both (1) the cup's surface area that is available for soak up of the electrolyte and (2) the anode to cathode surface area.

U.S. Pat. No. 3,748,181 describes the concept of attaching a plastic strip to the top edge of a separator that is formed into a convoluted wound separator basket for cylindrical batteries. The film eliminates any internal short circuits that are caused by mix smearing near the open end of the can during the mix insertion process.

U.S. Pat. No. 4,220,693 describes a separator for alkaline cells. One of the embodiments discloses polypropylene secured to the entire surface of the base separator film.

U.S. Pat. No. 3,097,975 describes internal short circuits that are caused when one electrode "grows" through the separator's interstices. The suggested solution is to use a pulverulent material, such as aluminum oxide or magnesium oxide, to reduce the size of the interstices.

It is an object of the present invention to provide a means for effectively preventing internal shorting at the bottom area of a cell's container.

It is another object of the present invention to provide a separator for alkaline cells that is easy and economical to make and that can effectively prevent the cathode material of the cell from penetrating through the separator at the bottom area of the container of the cell.

It is another object of the present invention to provide an electrical insulating barrier layer or film on the bottom surface of the separator between the anode and cathode.

It is another object of the invention to provide a process for assembling the separator into the cell.

These and other objects and advantages of the invention will be apparent from the following description and drawings.

SUMMARY OF THE INVENTION

The invention relates to an electrochemical cell assembled in a housing comprising a container having a closed end and an open end closed by a cover; a first active electrode material positioned within and contacting the inner wall of the container and defining a centrally disposed cavity; a separator comprising at least two separator strips with each strip having a bottom segment with extending walls and each wall being defined by two edges; the bottom segment of one strip being superimposed on the bottom segment of the other strip with the extending walls of each strip arranged to face the edges of the walls of the other strip so that the walls define a cavity in said separator; said separator positioned within and contacting said first active electrode material; a second active electrode material positioned within said cavity of the separator; a first terminal on the housing electrically connected to said first active electrode material; a second terminal on the housing electrically insulated from the first terminal and electrically connected to said second active electrode material; and wherein an electrically insulating barrier layer is positioned on the surface of at least one of the bottom segments of the separator strips to prevent internal shorting between the electrodes.

As used herein a layer shall mean a coating, film or any other discrete material that is on or in the surface of a bottom segment of the separator strip. Suitable electrically insulating barrier layer materials would include polypropylene, polyethylene, polyvinyl chloride, asphalt, wax, polyvinylidene chloride, cellophane and nylon. The electrically insulating barrier layer could also comprise a film or strip having an adhesive on one of its surfaces so that it could be secured to a selected area (bottom segment) of a separator strip. If the electrically insulating barrier material is a two sided type adhesive tape then it could be disposed between the bottom segments of the separator strips thereby keeping them secured during the assembly process. If the electrically insulating barrier material is plastic then it could be attached to the bottom surface of a separator strip using heat to laminate the plastic to the separator or the plastic could be extruded directly onto the separator. In all embodiments, the electrically insulating barrier material should provide effective protection against piercing of the bottom segment of the separator by small bits of active electrode material to prevent the development of an internal electrical short circuit.

Preferably, the first active electrode material would be the cathode material comprising an oxidic depolarizer such as manganese dioxide usually mixed with a binder and conductive material such as graphite, acetylene black or mixtures thereof. Preferably, the second active electrode material would be an anode comprising zinc admixed with a gelling agent and a suitable alkaline electrolyte such as aqueous potassium hydroxide solution. Anode materials and their preparation are described in U.S. Pat. Nos. 2,930,064, 2,935,547 and 2,993,947. The disclosure of these references is incorporated herein as if they were presented in their entirety.

The separator of this invention may be composed of any separator material such as woven or non-woven paper of cellulose fibers laminated to a similar mat of vinyl fibers, kraft paper, alpha cellulose paper, methyl cellulose film, polyvinyl alcohol, copolymers of polyvinyl acetate and polyvinyl chloride, rayon, nylon, and mixtures thereof.

BRIEF DESCRIPTION OF THE DRAWINGS

FIG. 1 shows a first strip of separator material 2 positioned over and rotated 90° on a second strip of separation material 4 so that overlapping occurs only in area 6. Deposited between separator 2 and separator 4 in area 6 is an electrically insulating barrier layer 8. As shown in FIG. 2, when projecting the separator strips into a circular cavity of a cathode lined container, walls 10 and 12 of strip 2 would be bent normal to area 6 forming a circular configuration. Walls 14 and 16 would also be bent normal to area 6 and encircle walls 10 and 12 to provide an overall cylindrical configuration as shown in FIGS. 2 and 3. This cylindrical configuration would conform to the interior of the cathode pressed firmly against the inside wall of a cell's container. As evident from FIGS. 2 and 3, wall 14 faces edges 17 of wall 2 and edge 18 of wall 10; wall 16 faces edges 20 of wall 10 and edge 22 of wall 2; wall 12 faces edge 24 of wall 14 and edge 26 of wall 4; and wall 10 faces edge 28 of wall 14 and edge 30 of wall 16. Thus the separator strips 2 and 4 are folded during insertion into a cylindrical cavity of the cathode and conforms to the shape of the cylindrical cavity. As shown in FIG. 4, the overlapping area 6 containing the electrically insulating barrier 8 is positioned at the bottom of the cylindrical cavity of the cathode 32 in contact with the bottom inner surface of cathode 32. Thus the electrically insulating barrier 8 will effectively prevent small pieces of the cathode material at the bottom 34 of cathode 32 from penetrating into and through the separator at area 6 when the separator strips 2 and 4 are forced into the cavity of the cathode and against the bottom 34 of cathode 32.

Although the edges of the walls (20–22; 28–30; 17–18; and 24–26) of the separator strips are shown abutting to provide a circular cylindrical configuration, in reality the edges usually overlap to form an irregular cylindrical configuration. In some applications, the edges may be separated and still provide an overall irregular configuration that can be used in some cell applications. The only requirement is that the separator strips provide a cylindrical type basket having an overall upstanding wall that is completely closed so that the cathode is not in direct contact with the anode in any area of the separator.

Figure 1:
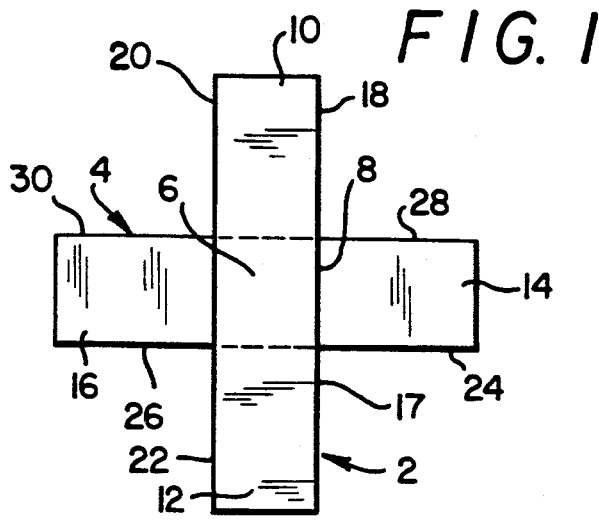
FIG. 1 is a top view of two separator strips showing the first strip superimposed over a second strip which is positioned 90° to the first strip so that only the central areas overlap.
Figure 2:
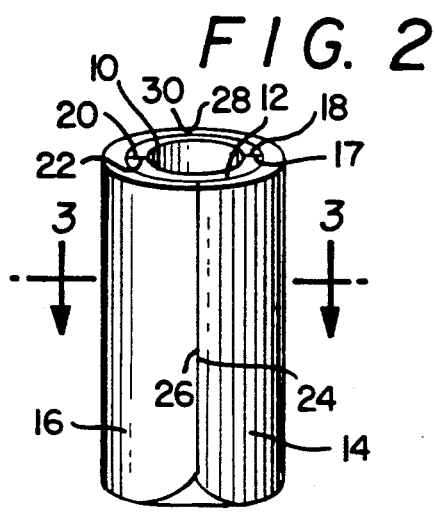
FIG. 2 is an isometric view of the two separator strips after the non-overlapping segments (walls) of the strips are folded normal to the plane of the overlapping area of the strips and curved inward to form a closed end cylindrical configuration.
Figure 4:
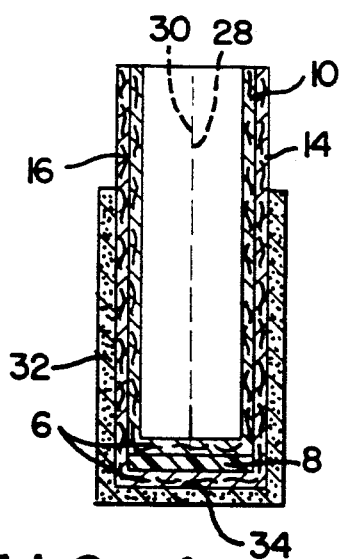
FIG. 4 is a sectional view of the separator of FIG. 2 positioned within the cavity of a cylindrically constructed cathode.
Figure 3:
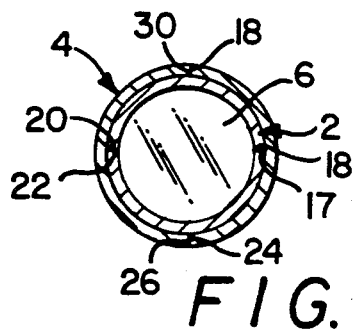
FIG. 3 is a cross-sectional view of FIG. 2 taken through line 3—3.
Figure 5:
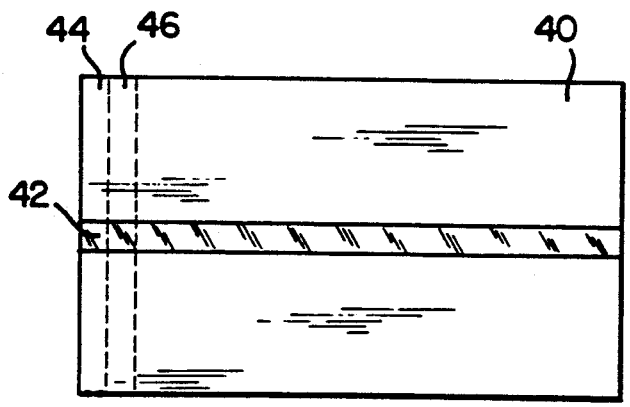
FIG. 5 is a top view of a sheet of separator material having an electrically insulating barrier layer secured to the middle area of the sheet.

FIG. 5 shows a sheet of separator material 40 having a strip of an electrically insulating barrier layer 42 secured at its midsection. The sheet 40 could be cut into strips 44, 46 etc. as shown by broken lines to provide a separator strip 44 that could be used as one of the separator strips shown in FIG. 1. If desired, two such strips 44, 46 could be used if a double layer of electrically insulating barrier material is desired for a particular application. Referring to FIG. 1, the electrically insulating barrier 8 could be placed on the top and/or bottom side of strip 2; and/or on the top and/or bottom side of strip 4 depending on the particular application of the separator in the cell.

A process for assembling a cell using the separator of this invention would comprise the steps:

(a) positioning a first active electrode material, such as a cathode, inside a container closed at the bottom and open at the top so that the first active electrode material defines a centrally disposed cavity, said container being adapted as the terminal for said first active electrode material;

(b) forcing a first strip of separator material and a second strip of separator material into the cavity of the first active electrode material and forcing the strips to assume the contour of the cavity of the first electrode material, said first strip being positioned 90° with respect to said second strip so that a selected area at the midsection of the strips overlaps and an electrically insulting barrier layer is positioned on the surface of at least one of the strips at the selected area at the midsection of the strips that overlaps;

(c) adding a second active electrode material into the cavity of the separator material; and (d) sealing the open end of the container with a cover and wherein at least a portion of the cover is electrically insulated from the container and electrically contacting said second active electrode material thereby said portion being adapted as the terminal for the second active electrode material.

Specifically, a standard alkaline cell can be produced by preparing a quantity of powdered cathode material and disposing it into the open end of a cylindrical container. A molding ram is then pressed into the powdered mixture that is contained within the container and since the ram's outside diameter is substantially smaller than the inside diameter of the can, an elongated "ring" of cathode mix is molded tightly against the container's interior circumference. After the ram is withdrawn, a tubular shaped cavity is formed into the central portion of the cathode. Two strips of a separator material are inserted into the cathode's centrally located cavity in order to form a "separator basket". An electrolyte and a gel-like anode are dispensed into the separator basket and then a seal assembly is inserted into the open end of the container. This assembly includes an elongated current collector that projects into the anode and also includes a plastic disc-shaped seal that fits tightly within the container's opening and is seated slightly below the top of the container. The top of the container is redrawn until the seal is radially compressed and then the lip of the container is crimped inwardly.

A preferred separator insertion process for standard alkaline cells would utilize two strip-shaped pieces of separator material. The first step in the separator insertion process involves cutting a first strip of separator to an appropriate length and width. The length should be equal to at least twice the cathode's height plus the inside diameter of the cathode. The width of the strip should be slightly greater than one-half the cathode's inside circumference. Next, the first strip is positioned over the open end of a container that contains a molded cathode. The strip's broad surfaces must be perpendicular to the cathode's longest dimension and the center point of the separator must align with the cathode's longitudinal axis. A rod-shaped separator insertion ram is positioned above the open end of the container. The rod's outside diameter should be slightly smaller than the inside diameter of the cathode's cavity and the circumference of the ram should be concentric with the circumference of the cathode's cavity. As the ram descends it carries the middle portion of the separator downward into the cathode's central cavity until the separator touches the inside bottom of the cathode. The two walls of the separator strip that extend beyond the separator's central region extend upward from the bottom of the cathode and line the cathode's sidewalls. The surface of the first strip that contacts the cathode is known as the outside surface of the first strip while the opposite side of the separator is known as the inside surface of the first strip. A second strip of separator is cut to the correct length and width. The central portion of the second strip is positioned over the open end of the cathode that already contains the first separator strip. When the second strip is positioned above the container, it is rotated so that after the second strip is inserted into the container, the seams of the second strip are turned ninety degrees relative to the seams in the inserted first separator strip. This rotational offset seam arrangement inhibits particles of zinc in the anode mix that could otherwise work their way through the seams of both separators and thereby create an internal short circuit. After the second strip has been properly located, another rod-shaped insertion ram is positioned above the cathode and concentrically aligned with the inside diameter of the cathode's cavity. The second separator insertion ram descends and inserts the second separator strip inside the previously inserted first separator strip. The walls of the second separator extend upward from the bottom of the cathode and line the inside surface of the first separator. The surface of the second separator that contacts the inner surface of the first separator is known as the outside surface of the second separator. The other surface of the second separator faces the longitudinal axis of the cathode's cavity and is known as the inside surface of the second separator.

An efficient and reliable separator insertion process is generally critical to the production of standard alkaline batteries on a continuous basis. The separator should be consistently inserted to the bottom of the cathode's cavity at the high speeds required by mass production processes and this must be done without abusing the separator. The proposed invention is specifically designed to solve the problem of driving particles of cathode mix into the separator as the separator insertion rams "bottom out" against the inside bottom of the cathode. Protection against cathode mix penetrating through the bottom of the separator is preferably achieved by applying a strip of plastic to the outside surface of the second separator. In order to reliably prevent mix penetration through the bottom o( the separator, the width of the plastic strip must cover the entire bottom of the separator basket or diameter of the cavity of the cathode. Selection of the plastic strip's width, location of the strip on the separator and insertion of the strip into the cathode must be coordinated and controlled to insure that the plastic strip prevents mix penetration and does not limit the cell's service to an unacceptable degree.

Additional benefits include preventing the build up of material in the anode compartment which can lead to the formation of zinc dendrites in the anode that extend through the separator into the cathode.

EXAMPLE

Six hundred standard "4A" size alkaline cells were produced using a two strip separator as described above. Four hundred identical cells were made except that a polypropylene film was disposed between the overlapping separator strips at the bottom segment of the separator that was forced against the bottom surface of the cathode mix. The cells were placed in storage at 45° C. for 6 months and then tested. The cells with the polypropylene film were found to have no short circuits while the standard cells without the polypropylene film were found to have 3.2% failure due to penetration of cathode material through the bottom segment of the separator.

While the invention has been described in conjunction with specific embodiments, it is obvious that certain modifications may be made to the invention without deviating from the scope of the invention.

What is claimed:

1. An electrochemical cell assembled in a housing comprising a container having a closed end and an open end closed by a cover; a first active electrode material positioned within and contacting the inner wall of the container and defining a centrally disposed cavity; a separator comprising at least two separator strips with each strip having a bottom segment with extending walls and each wall being defined by two edges; the bottom segment of one strip being superimposed on the bottom segment of the other strip with the extending walls of each strip arranged to face the edges of the walls of the other strip so that the walls define a cavity in said separator; said separator positioned within and contacting said first active electrode material; a second active electrode material positioned within said cavity of the separator; a first terminal on the housing electrically connected to said active electrode material; a second terminal on the housing electrically insulated from the first terminal and electrically connected to said second active electrode material; and wherein an electrically insulating barrier layer is positioned on the surface of at least one of the bottom segments of the separator strips to prevent internal shorting between the electrodes.

2. The electrochemical cell of claim 1 wherein the electrically insulating barrier layer is a material selected from the group comprising polypropylene, polyethylene, polyvinyl chloride, asphalt, wax, polyvinylidene chloride, cellophane and nylon.

3. The electrochemical cell of claim 1 wherein each separator strip has a top surface and a bottom surface and the electrically insulating barrier layer is disposed on the top surface of the bottommost separator strip.

4. The electrochemical cell of claim 1 wherein each separator strip has a top surface and a bottom surface and the electrically insulating barrier layer is disposed on the bottom surface of the topmost separator strip.

5. The electrochemical cell of claim 1 wherein the electrically insulating barrier layer is an adhesive strip of plastic tape.

6. The electrochemical cell of claim 1 wherein the separator has two strips.

7. The electrochemical cell of claim 1 wherein the first active electrode material is the cathode and the second active electrode material is the anode.

8. The electrochemical cell of claim 7 wherein the cathode comprises manganese dioxide and the anode comprises zinc.

9. The electrochemical cell of claim 8 wherein the separator has two strips.

10. The electrochemical cell of claim 9 wherein the electrically insulating barrier layer is disposed between the bottom segments of the two separator strips.

11. The electrochemical cell of claim 10 wherein the electrically insulating barrier layer is a plastic layer.

12. The electrochemical cell of claim 11 wherein the plastic layer is selected from the group consisting of polypropylene and polyethylene.

13. A process for assembling an electrochemical cell comprising the steps:

(a) positioning a first active electrode material inside a container closed at the bottom and open at the top so that the first active cathode material defines a centrally disposed cavity, said container being adapted as the terminal for said first active electrode material;

(b) forcing a first strip of separator material and a second strip of separator material into the cavity of the first active electrode material and forcing the strips to assume the contour of the cavity of the first electrode material, said first strip being positioned 90° with respect to said second strip so that a selected area at the midsection of the strips overlaps and an electrically insulating barrier layer is positioned on the surface of at least one of the strips at the selected area at the midsection of the strips that overlap;

(c) adding a second active electrode material into the cavity of the separator material; and (d) sealing the open end of the container with a cover and wherein at least a portion of the cover is electrically insulated from the container and electrically contacting said second active electrode material thereby said portion being adapted as the terminal for the second active electrode material.

14. The process of claim 13 wherein in step (b) the first strip is forced into the cavity of the first active electrode material and then the second strip is rotated 90° to the original orientation of the first strip and then forced into and upon the first strip.

15. The process of claim 13 wherein the electrically insulating barrier layer is a material selected from the group comprising polypropylene, polyethylene, polyvinyl chloride, asphalt, wax, polyvinylidene chloride, cellophane and nylon.

16. The process of claim 13 wherein the electrically insulating barrier layer is disposed between the first strip and the second strip.

17. The process of claim 14 wherein the electrically insulating barrier layer is disposed on the top surface of the first strip.

18. The process of claim 13 wherein the first active electrode material is the cathode and the second active electrode material is the anode.

19. The process of claim 18 wherein the cathode comprises manganese dioxide and the anode comprises zinc.

20. The process of claim 19 wherein the electrically insulating barrier layer is a plastic selected from the group consisting of polypropylene and polyethylene, and said layer is disposed between the first strip and the second strip.

* * * * *